(12) United States Patent
Kirkman (10) Patent No.: US 10,056,007 B2
(45) Date of Patent: Aug. 21, 2018

(54) MOTION CONTROL APPARATUS

(71) Applicant: WILLIAMS GRAND PRIX ENGINEERING LIMITED, Grove, Oxfordshire (GB)

(72) Inventor: David Kirkman, Oxfordshire (GB)

(73) Assignee: WILLIAMS GRAND PRIX ENGINEERING LIMITED, Grove, Oxfordshire (GB)

( * ) Notice: Subject to any disclaimer, the term of this patent is extended or adjusted under 35 U.S.C. 154(b) by 419 days.

(21) Appl. No.: 14/650,563

(22) PCT Filed: Dec. 6, 2013

(86) PCT No.: PCT/GB2013/053226
§ 371 (c)(1),
(2) Date: Sep. 28, 2015

(87) PCT Pub. No.: WO2014/087172
PCT Pub. Date: Jun. 12, 2014

(65) Prior Publication Data
US 2016/0379512 A1 Dec. 29, 2016

(30) Foreign Application Priority Data

Dec. 6, 2012 (GB) .................................. 1221980.4

(51) Int. Cl.
*G09B 9/02* (2006.01)
*G09B 9/12* (2006.01)
*G09B 9/04* (2006.01)
*G09B 9/06* (2006.01)
*G09B 9/52* (2006.01)

(52) U.S. Cl.
CPC ................. *G09B 9/12* (2013.01); *G09B 9/04* (2013.01); *G09B 9/06* (2013.01); *G09B 9/52* (2013.01)

(58) Field of Classification Search
USPC ........ 434/30, 34, 37, 46, 55, 56, 57, 58, 61, 434/62, 29
See application file for complete search history.

(56) References Cited

U.S. PATENT DOCUMENTS 5,853,330 A * 12/1998 Engstrand ................. A63J 5/00
434/55
5,951,018 A * 9/1999 Mamitsu .................. G09B 9/02
273/442

(Continued)

FOREIGN PATENT DOCUMENTS

GB 2378687 * 2/2003 ............... G09B 9/02
GB 2378687 A 2/2003

(Continued)

OTHER PUBLICATIONS

European Examination Report for corresponding EP13805486.1, dated Jul. 25, 2016.

*Primary Examiner* — Kurt Fernstrom
(74) *Attorney, Agent, or Firm* — Lando & Anastasi, LLP (57) ABSTRACT

A motion simulator (10) has a body tub (12) fixed on a carrier platform (14), the carrier platform being supported via motion control apparatus (52, 54, 56, 58), each having bearings which translate along an inclined path, the motion control apparatuses together providing six degrees of motion for the carrier platform.

24 Claims, 9 Drawing Sheets

(56) References Cited

U.S. PATENT DOCUMENTS 5,997,303 A * 12/1999 Yoshida ................ G09B 9/04
                                                434/61
6,077,078 A *  6/2000 Alet .................... F16M 11/046
                                                434/29
6,110,049 A *  8/2000 Wilkens ............. G01M 17/007
                                                472/36

FOREIGN PATENT DOCUMENTS

| | | |
|---|---|---|
| JP | 2011045984 A | 3/2011 |
| JP | 2012047459 A | 3/2012 |
| KR | 20100128736 A | 12/2010 |
| WO | 97/41545 | * 11/1997 ............... G09B 9/00 |

* cited by examiner

MOTION CONTROL APPARATUS

CROSS-REFERENCE TO RELATED APPLICATIONS

This application is a U.S. National Stage Entry under 35 U.S.C. § 371 of PCT/GB2013/053226, titled MOTION CONTROL APPARATUS, filed Dec. 6, 2013, which claims priority to British Patent Application No. 1221980.4 filed Dec. 6, 2012, which patent applications are hereby incorporated herein by reference in their entireties for all purposes.

BACKGROUND

Field of Technology

The present invention relates to motion control apparatus for controlling the motion of motion control simulator occupant stations and the like, for example with six degrees of motion.

Description of Related Background

A Stewart platform or hexapod has a user platform controlled relative to a base by six telescopic struts. The struts take the full weight of the platform and users. The apparatus may be very large and heavy. Due to the large range of movement provided by the struts to provide sufficient movement, the apparatus may be very tall, such that a staircase with a significant number of steps may be required in order to get in and out of the motion simulator. Furthermore a large volume of dead space under the platform needs to be secured so that people and objects are not crushed under the simulator while it is working. The struts have to be relatively powerful with this type of configuration and it is difficult to provide high bandwidth for horizontal motion and to provide high horizontal forces and accelerations. This type of simulator maybe useful for aircraft of the type in which high horizontal forces and accelerations do not need to be simulated but is not universally realistic since some real vehicles such as motor racing cars can be subject to very high horizontal forces and accelerations, for example when braking or accelerating and when cornering.

GB-A-2378687 discloses a motion simulator in which four motion control apparatuses are provided, each one having a first support in the form of a rocker arm which is pivotally connected to a second support, the second support being slideable along a linear track. The four rocker arms are pivotally connected to two support rails which support a platform bearing a single seat body tub. Each motion control apparatus also includes a third support which is pivotally connected to the rocker arm at a location remote from the axis of pivotal connection of the rocker arm to the second support. The third support is movable relative to the second support, this relative movement causing rotation of the rocker arm about the second support. The disclosed arrangement permits motion simulation with 6 degrees of freedom, i.e. rotation about three perpendicular axes plus surge backwards/forwards translation, heave up/down translation and sway left/right translation. It has, however, been found challenging with a rocker arm arrangement using relatively small motors to provide high levels of heave and surge. The challenges include having to make the rockers relatively large to achieve a desired range of motion but this increase in rocker size introduces a lack of stiffness into the system.

The lack of stiffness makes it difficult to achieve good displacement, velocity and frequency response bandwidth in the system.

The present invention aims to alleviate at least to a certain extent at least one problem of the prior art. An alternative object of the invention is to provide a useful motion control apparatus.

SUMMARY

According to a first aspect of the invention there is provided a motion control apparatus for controlling the motion of a motion simulator occupant station or the like, for example with six degrees of freedom of movement, the apparatus including at least one height controller for controlling height of a first support relative to a second support thereof, wherein the height controller incorporates a wedge arranged for wedgingly controlling the height of the first support relative to the second support with a wedging action.

The first support may be translationally coupled to the second support for movement relative thereto along an inclined path.

According to a second aspect of the invention there is provided a motion control apparatus for controlling the motion of a motion simulator occupant station or the like, for example with six degrees of freedom movement, the apparatus including at least one height controller for controlling height of a first support relative to a second support thereof, wherein the first support is translationally coupled to the second support for movement relative thereto along an inclined path.

The height controller may include a wedge for controlling relative motion between the first and second supports with a wedging action.

The inclined path may be within or substantially within an inclined plane (i.e. planar) and is preferably straight or substantially straight.

The motion control apparatus may be configured, in use, for the inclined plane to be configured at an angle of about 20 to 40 degrees to horizontal. The angle may be about 25 to 30 degrees.

Guide means may be provided for guiding travelling of the first support along an inclined surface of the second support, the guide means preferably comprising a carriage, the carriage preferably being substantially frictionless.

The first support may include a pivotal or flexible connection arranged for connection to an occupant support member, such as an occupant support rail.

A motor, such as a linear drive motor, may be provided for driving the first support relative to the second support.

Guide means may be provided for guiding travelling of the second support along a base support.

According to a further aspect of the invention there is provided a motion simulator comprising an occupant housing support structure, a first motion control apparatus as set out in either or both of the previous aspects of the invention, and a base support, the first motion control apparatus supporting the occupant housing support structure from the base support.

A motor may be provided for driving the second support along the base support.

The motor for driving the first support relative to the second support may be adapted to drive a third support along the base support, the third support being connected by a rod to the first support.

The rod may be pivotally connected to each of the first and third supports, such that the rod is configured to transfer load between the first and third supports so as to move the first support relative to the second support substantially without (or without) rotation of the first support relative to the second support.

The base support may comprise a linear motor drive rail.

The base support may comprise a first base rail, the first motion control apparatus being located thereon to one side of the occupant housing support structure, a second said motion control apparatus being located on or on an extension of the first base rail on an opposite side of said occupant housing support structure.

The occupant housing support structure may include an occupant carrier base member (or carrier platform or chasis), a first occupant support rail may be coupled to the first support of the first motion control apparatus and (e.g. slidably) to the occupant carrier base member, and a second occupant support rail may be coupled to the first support of the second motion control apparatus and (e.g. slidably) to the occupant carrier base member.

The occupant support rails of the first and second motion control apparatuses may be configured non-parallel to one another, such as in a V shape, such that relative motion of the first supports of the first and second motion control apparatus towards or away from one another causes sliding of the occupant carrier base member in a substantially perpendicular direction which may be generally a longitudinal direction of the motion simulator.

The motion simulator may include a second said base support in the form of a second base rail, and the second base rail may be spaced from and preferably parallel to the first base rail. Third and fourth said motion control apparatuses may be provided on the respective said one and other sides of the occupant housing support structure at the second base rail and longitudinally spaced from the first and second motion control apparatuses.

The first supports of either the first and second or the third and fourth motion control apparatuses may be slidably coupled to the first and second occupant support rails.

The motion simulator may include an occupant station or housing mounted on the occupant carrier base member.

The occupant station may include solo seating for a single user, or tandem, side by side, row or multiple seating for multiple users.

The motion simulator may be an aircraft, spacecraft, hovercraft or water craft simulator.

The motion simulator may be a motor land vehicle simulator.

The motion simulator may be a motor car simulator.

The motion simulator may be a single seat motor car, e.g. racing car, simulator and in which the occupant station comprises a single seat body tub.

The motion simulator may be a tracked or off-road vehicle simulator.

BRIEF DESCRIPTION OF THE DRAWINGS

The present invention may be carried out in various ways and a preferred embodiment of a motion control apparatus and motion simulator incorporating the same in accordance with the invention will now be described by way of example with reference to the accompanying drawings, in which.

DETAILED DESCRIPTION

According to a first aspect of the invention there is provided a motion control apparatus for controlling the motion of a motion simulator occupant station or the like, for example with six degrees of freedom of movement, the apparatus including at least one height controller for controlling height of a first support relative to a second support thereof, wherein the height controller incorporates a wedge arranged for wedgingly controlling the height of the first support relative to the second support with a wedging action.

The wedge is highly advantageous. It is not as susceptible to torsion or bending as a primary way to impart motion as prior devices. The apparatus can be incorporated in a simulator with six degrees of freedom in which good displacement, velocity and frequency bandwidth may be achieved, including exceptionally good performance in all six degrees of freedom including surge and heave. It also advantageously allows a significantly more linear motor force to heave response curve than a rocker arm design.

In a preferred embodiment, the apparatus may be for imparting motion of a motion simulator and the height controller may comprise a movable height locating device for positioning a height of the first support, the wedge being arranged to wedgingly position the height of the first support relative to the second support with the wedging action.

The first support may be translationally coupled to the second support for movement relative thereto along an inclined path.

According to a second aspect of the invention there is provided a motion control apparatus for controlling the motion of a motion simulator occupant station or the like, for example with six degrees of freedom movement, the apparatus including at least one height controller for controlling height of a first support relative to a second support thereof, wherein the first support is translationally coupled to the second support for movement relative thereto along an inclined path.

The translation along an inclined path is highly advantageous. It does not rely upon torsion or bending as a primary way to impart motion. The apparatus can be incorporated in a simulator with six degrees of freedom in which good displacement, velocity and frequency bandwidth may be achieved, including exceptionally good performance in all six degrees of freedom including surge and securely. It also advantageously allows a significantly more linear motor force heave response curve than a rocker arm design.

The height controller may include a wedge for controlling relative motion between the first and second supports with a wedging action.

The inclined path may be within or substantially within an inclined plane (i.e. planar) and is preferably straight or substantially straight.

The motion control apparatus may be configured, in use, for the inclined plane to be configured at an angle of about 20 to 40 degrees to horizontal. The angle may be about 25 to 30 degrees. Alternatively, the angle is preferably about 10 to 60 degrees, for example about 15 to 45 degrees, more typically 20 to 40 degrees, in some embodiments being about 25 to 35 degrees, some specific examples being about 26.5 to 27 or about 30 degrees. With the angle at about 25 to 30 degrees, a horizontal motion of about 2 units of distance of the first support relative to the second support causes a relative vertical motion between the two of about 1 unit of distance. This is advantageous for providing good displacement, velocity and frequency bandwidth in the motion control, also enabling high levels of heave and surge with a stiff enough system to provide an approximately 2:1 motion ratio with relatively small and light motors.

The inclined path may alternatively be generally planar or slightly curved.

Guide means may be provided for guiding travelling of the first support along an inclined surface of the second support, the guide means preferably comprising a carriage, the carriage preferably being substantially frictionless. Where the inclined path is planar, the reaction forces between the first and second supports may therefore advantageously be normal to the path, and this may advantageously help to minimise backlash in the apparatus by minimising bending or other distortion, thereby enabling high frequency response to motion commands.

The first support may include a pivotal or flexible connection arranged for connection to an occupant support member, such as an occupant support rail. The pivotal connection may allow for rotation of the occupant support rail relative to the first support with three degrees of freedom. The pivotal connection may comprise a gimbal arrangement, which may provide low friction. However, other arrangements which also provide three degrees of rotational freedom are also envisaged such as a ball and socket joint or flexible coupling.

A motor, such as a linear drive motor, may be provided for driving the first support relative to the second support.

Guide means may be provided for guiding travelling of the second support along a base support.

According to a further aspect of the invention there is provided a motion simulator comprising an occupant housing support structure, a first motion control apparatus as set out in either or both of the previous aspects of the invention, and a base support, the first motion control apparatus supporting the occupant housing support structure from the base support.

A motor may be provided for driving the second support along the base support.

The motor for driving the first support relative to the second support may be adapted to drive a third support along the base support, the third support being connected by a rod to the first support.

In other embodiments, the third support may be omitted and the first support may be driven directly along the second support by an actuator or motor acting between the first and second supports.

The rod may be pivotally connected to each of the first and third supports, such that the rod is configured to transfer load between the first and third supports so as to move the first support relative to the second support substantially without (or without) rotation of the first support relative to the second support. The rod may be arranged to take up a substantially horizontal position when the first support is at a point of motion relative to the second that is between motion end points. This point of motion may be generally at a mid-point of the relative motion. Therefore, the motion response of the first support relative to the second may be substantially linear in response to motion of the third support relative to the first support, since rotation of the rod about the third support from a substantially horizontal position will not initially cause significant horizontal motion at the distal end of the rod. For example, a substantially 2:1 ratio of the horizontal movement of the third support to vertical component of motion of the first support may therefore be maintained throughout the motion envelope.

The base support may comprise a linear motor drive rail.

The base support may comprise a first base rail, the first motion control apparatus being located thereon to one side of the occupant housing support structure, a second said motion control apparatus being located on or on an extension of the first base rail on an opposite side of said occupant housing support structure.

The occupant housing support structure may include an occupant carrier base member (or carrier platform or chasis), a first occupant support rail may be coupled to the first support of the first motion control apparatus and (e.g. slidably) to the occupant carrier base member, and a second occupant support rail may be coupled to the first support of the second motion control apparatus and (e.g. slidably) to the occupant carrier base member.

The occupant support rails of the first and second motion control apparatuses may be configured non-parallel to one another, such as in a V shape, such that relative motion of the first supports of the first and second motion control apparatus towards or away from one another causes sliding of the occupant carrier base member in a substantially perpendicular direction which may be generally a longitudinal direction of the motion simulator.

The motion simulator may include a second said base support in the form of a second base rail, and the second base rail may be spaced from and preferably parallel to the first base rail. Third and fourth said motion control apparatuses may be provided on the respective said one and other sides of the occupant housing support structure at the second base rail and longitudinally spaced from the first and second motion control apparatuses.

The first supports of either the first and second or the third and fourth motion control apparatuses may be slidably coupled to the first and second occupant support rails. Where the third and fourth motion control apparatuses are located at a rearward location of the motion simulator relative to the first and second motion control apparatuses, the motion simulator having a forward direction defined by a direction generally faced by a user thereof, the third and fourth motion control apparatuses may be those slidably coupled to the first and second occupant support rails. The sliding feature enables motion such as yaw and pitch to be accommodated by the motion simulator due to the ability to accommodate varying distance between the first supports of the motion control apparatuses. The rails may also be prevented this way from extending forwards relative to the first and second motion control apparatuses.

The motion simulator may include an occupant station or housing mounted on the occupant carrier base member.

The occupant station may include solo seating for a single user, or tandem, side by side, row or multiple seating for multiple users.

The motion simulator may be an aircraft, spacecraft, hovercraft or water craft simulator.

The motion simulator may be a motor land vehicle simulator.

The motion simulator may be a motor car simulator.

The motion simulator may be a single seat motor car, e.g. racing car, simulator and in which the occupant station comprises a single seat body tub.

The motion simulator may be a tracked or off-road vehicle simulator.

Figure 1:
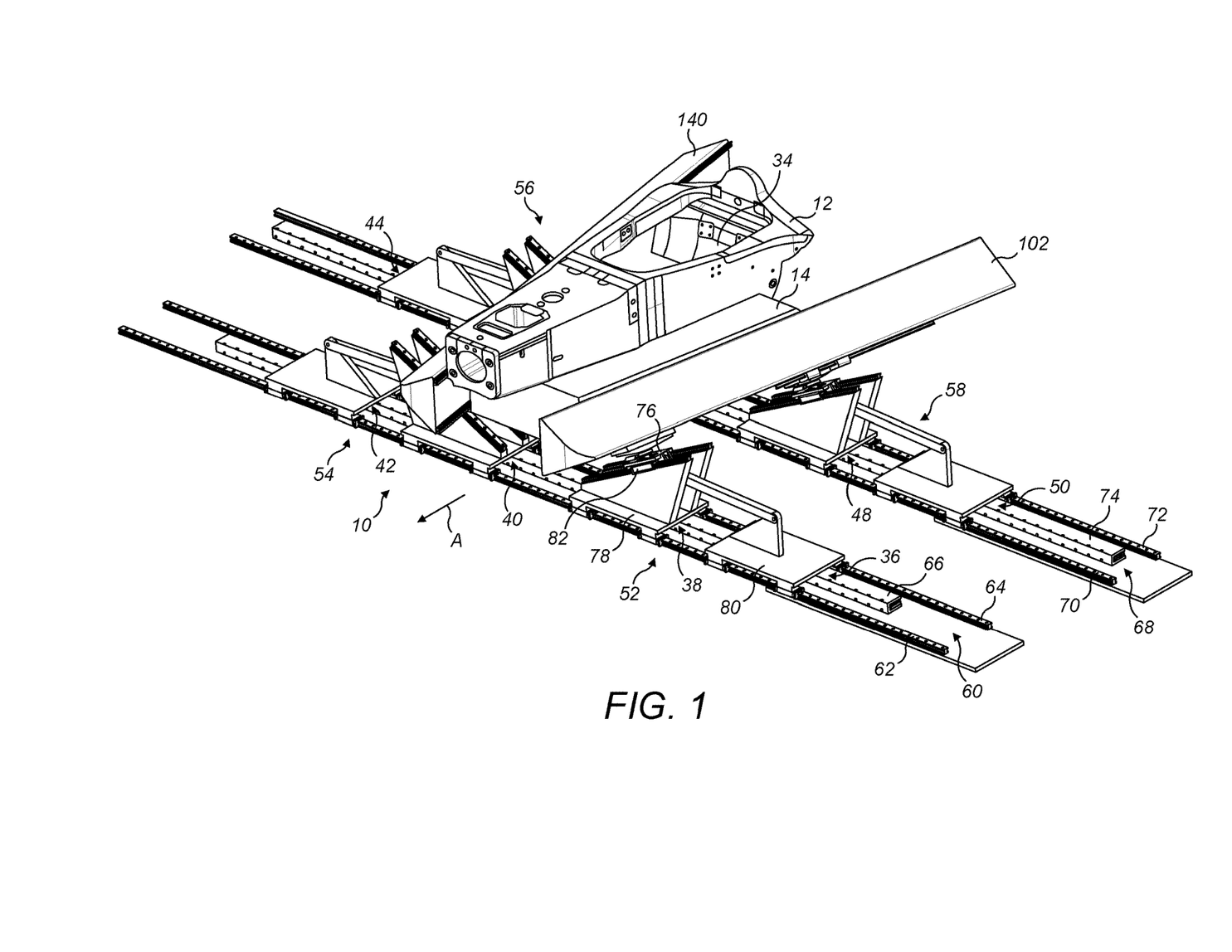
FIG. 1 shows an isometric view of a preferred embodiment of a single seat racing car motion simulator with a preferred motion control apparatus, the simulator being shown in a neutral position.

As shown in FIG. 1, a racing car motion simulator 10 incorporates a single seat body tub 12 fixed on a carrier platform 14. The body tub 12 may be permanently secured to the carrier tub 14 or may be removably attached so that it can be replaced with a different occupant station.

Figure 4:
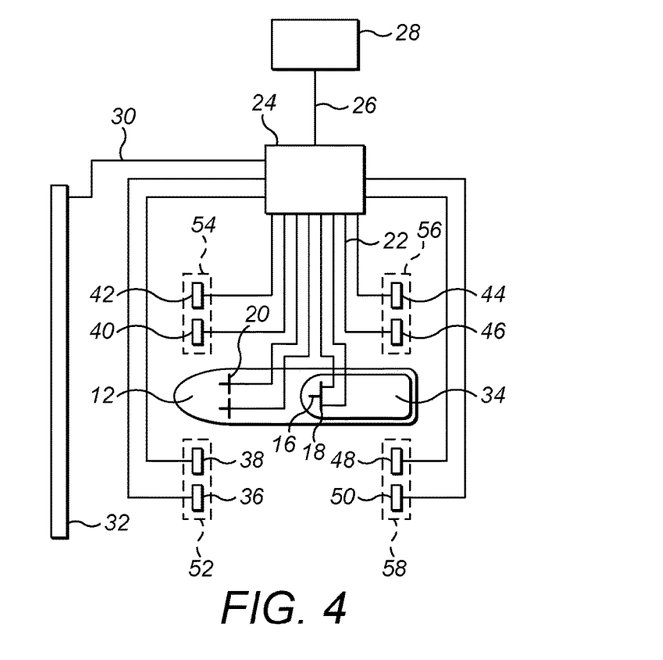
FIG. 4 is a schematic view of a control system for the simulator.

The body tub 12, as shown in FIG. 4, includes a steering wheel, control yoke or stick 16 having a number of control buttons 18. The body tub 12 also includes pedals 20 which may in this simulator simulate throttle and brake actuator pedals or others such as clutch or rudder actuator pedals in other embodiments. The buttons 18 and pedals 20 are connected by control paths 22 to a controller 24. The controller 24 is connected by a path 26 to a power source/monitoring system 28. The controller 24 is also connected by a signal path 30 to display means 32 for generating a visual display in front of the occupant (not shown) who may be sitting in a seat 34 of the body tub.

The controller 24 is also connected to motors, which in this embodiment are linear motors 36, 38, 40, 42, 44, 46, 48, 50, of four motion control apparatuses 52, 54, 56, 58 positioned around the simulator 10. As will be described below, the control apparatuses 52, 54, 56, 58 are controlled by the controller 24 to apply motion with six degrees of freedom to the carrier platform 14 and body tub 12 through use of the linear motors 36, 38, 40, 42, 44, 46, 48, 50.

As shown in FIG. 1, the simulator 10 has a front rail 60 which is horizontal and includes bearing rails 62, 64 and a central motor drive rail 66. The bearing rails 62, 64 and motor drive rail 66 are linear and horizontal and are securely held relative to the ground while the simulator 10 is in use. A first one 52 of the motion control apparatuses is located on front rail 60 to the left of the carrier platform 14 and a second one 54 of the motion control apparatuses is located on the front rail 60 on the right side of the carrier platform 14.

Spaced behind the front rail 60 is a similar rear rail 68 including bearing rails 70, 72 and a central drive rail 74 extending along the rear rail 68. A third one 56 of the motion control apparatuses is located on the rear rail 68 on the right side of the carrier platform 14 and a fourth one 58 of the motion control apparatuses is located on the rear rail 68 on the left side of the carrier platform 14.

The front left motion control apparatus 52 comprises a first support 76, a second support 78 and a third support 80.

The first support 76 includes a carriage 82 including first 84 (FIG. 2b) and second (FIG. 2a) slide bearings arranged for substantially frictionless sliding motion in which they are constrained to translate along an inclined path 88 defined by respective first 90 and second 92 (FIG. 2b) rails arranged on upstanding substantially triangular flanges 94, 96 of the second support 78.

Figure 2A:
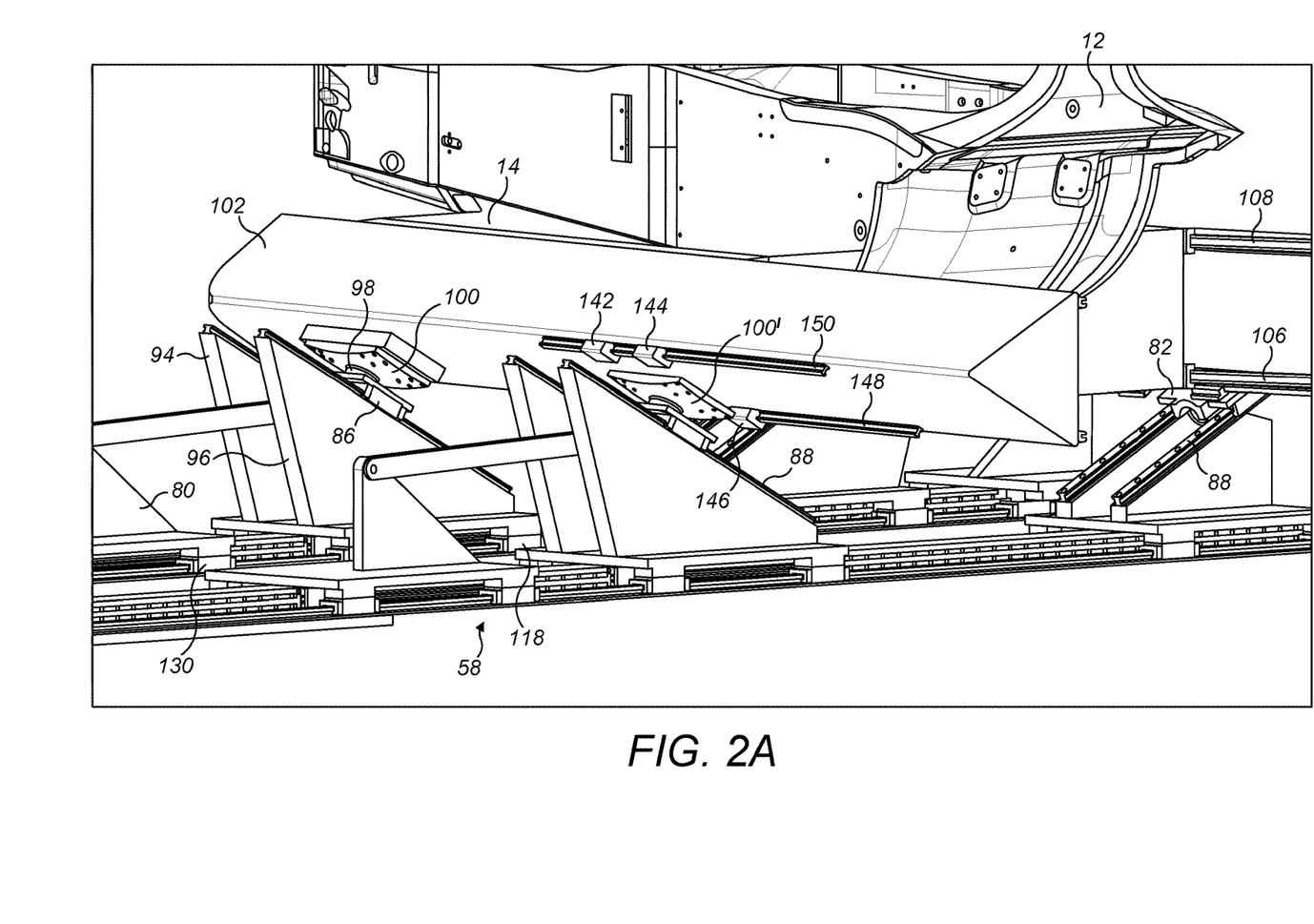
FIG. 2a shows a view of part of the simulator from behind and from the right hand side.
Figure 2B:
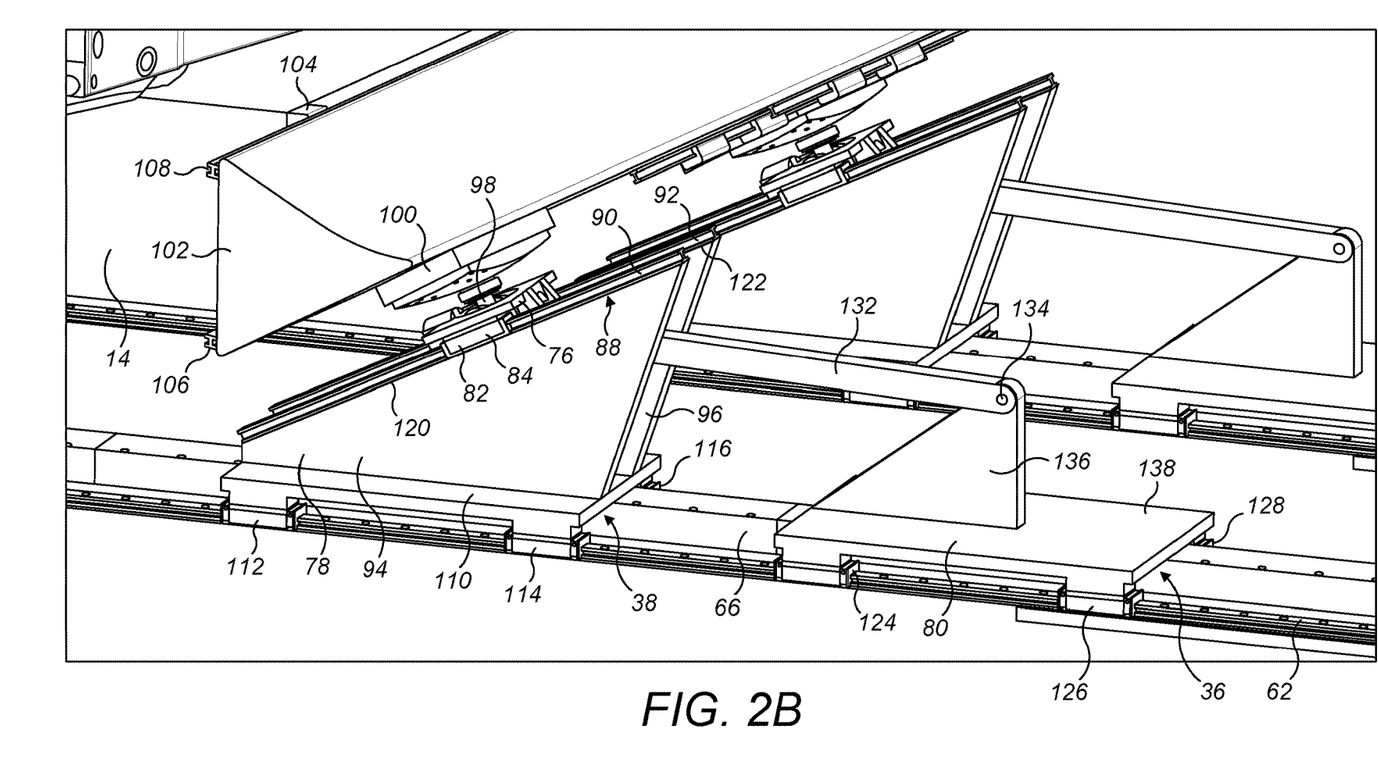
FIG. 2b shows a view of part of the simulator from in front and from the right.

As shown in FIG. 2b, the first support is connected by a gimbal 98 and mount 100 to a support rail 102 for the carrier platform 14. The gimbal 98 allows three degrees of rotation of the mount 100 and support rail 102 relative to the carriage 82 of the first support 76 in a substantially frictionless manner.

The carrier platform 14 is slideable relative to the support rail 102 via slide bearings 104 (one of which is shown in FIG. 2b) which are arranged to slide along slide rails 106, 108 in a substantially frictionless manner.

The second support 78 has a base plate 110 arranged to slide along a constrained linear path horizontally by virtue of sliding engagement of four slide bearings 112, 114, 116, 118 on rails 62, 64 (see FIGS. 2b and 2a) in a substantially frictionless manner. The motor 38 is located under the base plate for interaction with the motor rail 66.

The motor 38 is therefore arranged to drive the second support 78 with a linear translational movement horizontally along the rail 60 and substantially perpendicular to a generally longitudinal direction A (FIG. 1) of the simulator, which is the direction faced generally by a user (not shown) sitting the seat 34 of the body tub 12.

The top edges 120, 122 of the substantially triangular flanges 94, 96 and the first and second rails 90, 92 are configured extending linearly and at an angle of approximately 26.565 degrees, which is tan-10.5, to the horizontal and the inclined path 88 becomes higher moving to the side away from the carrier platform 14. Therefore, when the first support 76 is slid along the inclined path 88 relative to the second support 78, the first support 76 moves up or down one unit for every two units of horizontal movement.

In other embodiments, the inclined path 88 may make a different angle to horizontal than approximately 26.565 degrees, for example, an angle of about 10 to 60 degrees, for example about 15 to 45 degrees, more typically 20 to 40 degrees, in some embodiments being about 25 to 35 degrees, some specific examples being about 26.5, 27 or 30 degrees. In other embodiments, the angle may be under 10 degrees or over 60 degrees.

The third support 80 is, in a way similar to the second support 78, constrained for substantially frictionless sliding engagement along the front rail 60 by association of slide bearings 124, 126, 128, 130 (FIGS. 2b and 2a) along the bearing rails 62, 64. The motor 36 is arranged to drive the third support 80 along the motor drive rail 66.

Figure 6:
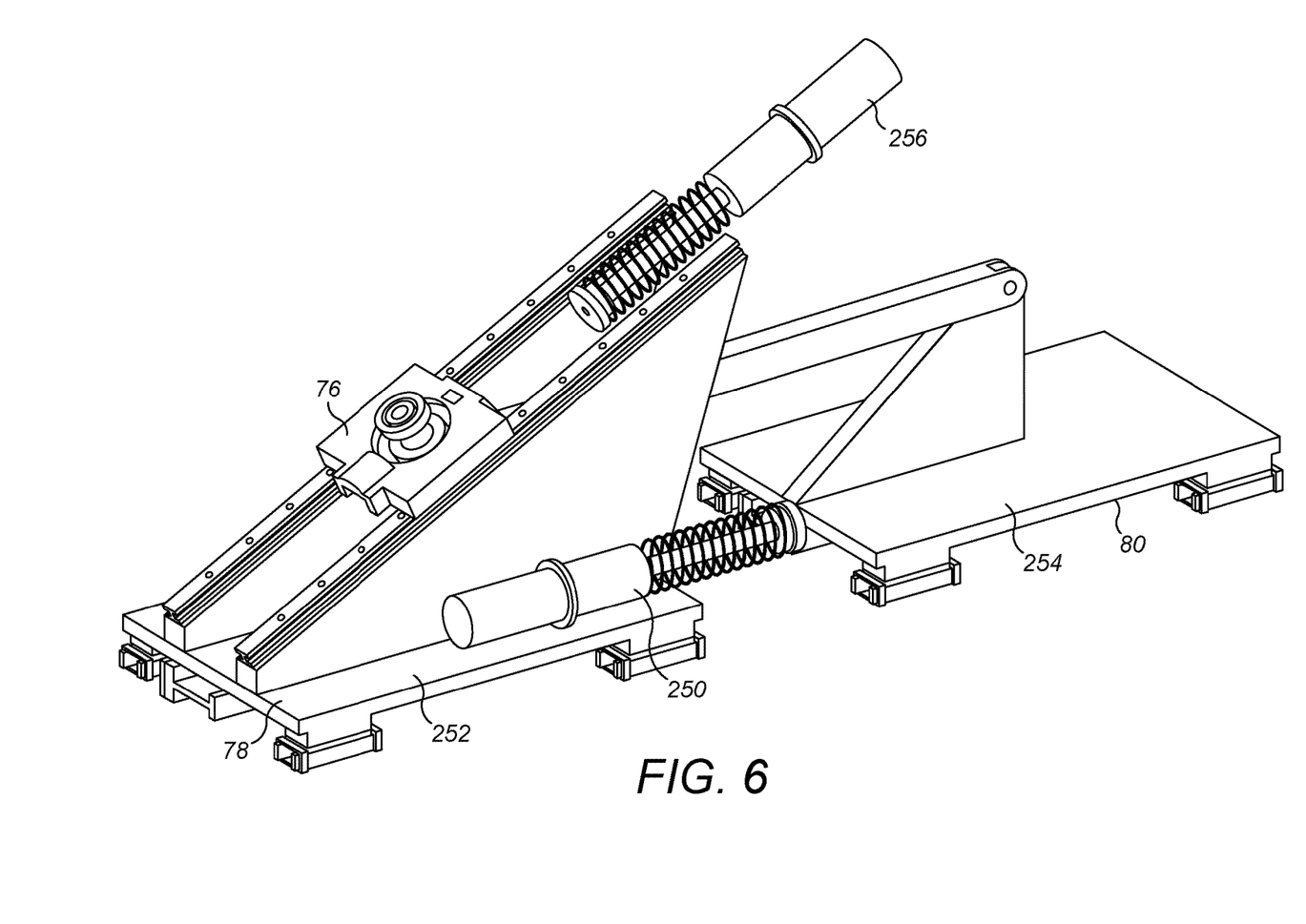
FIG. 6 shows a control apparatus of the simulator with gas struts/springs fitted.

A connector rod 132 is connected at one end (not shown) to the first support 76 in the region of the carriage 82 and at a second end 134 thereof to a connector flange 136 of the third support 80 which extends upwardly from a base 138 of the third support 80. The connector rod, in a neutral configuration or relaxed unpowered position of the motion simulator 10 shown in FIGS. 1 and 2b, extends substantially horizontally between its two ends. The carriage 82 of the first support 76 is approximately half way along its range of normal movement or slightly further up than half way along in this configuration. In this position, gas springs 250 (FIG. 6) position the unit/apparatus at a mid-point in order to reduce electrical power requirements in returning the slides (wedges of first 76 and second 78 supports) to this neutral point. Gas spring 250 acting between each sled 252,254 (or base) of the second 78 and third 80 supports (which could alternatively be a mechanical spring) may support the static mass of the system and help ensure the motors do not overheat. Further springs/gas struts 256 may be provided so as to act between the first 76 and second 78 support to limit upward motion of the first support 76 along the second support 78. Clamping brakes (not shown) for parking the simulator 10 are also provided.

The motors 36, 38 may be controlled to vary the spacing between the second support 78 and the third support 80 thereby driving the first support 76 up and down the inclined path 88. The substantially 2:1 ratio of horizontal to vertical movement of the first support 76 relative to the second support 78 provides a system with extremely good displacement, velocity and frequency bandwidth performance and very substantial stiffness with high levels of motion including heave and surge being obtainable while being able to use small and lightweight motors/actuators.

The second motion control apparatus 54 is substantially a mirror image of the first motion control apparatus 52 and its first support (which is the same as the first support 76 of the first motion control apparatus 52) is connected to a second support rail 140 in a similar way to that in which the mount 100 of the first support 76 of the first motion control apparatus 52 is attached to the first support rail 102.

The third 56 and fourth 68 motion control apparatuses are configured on the rear rail 68 in a similar way to that in which the first and second motion control apparatuses 52, 54 are configured on the front rail 60. However, as shown in FIG. 2a, the mounts 100' of the third and fourth 56, 58 motion control apparatuses are slidably connected by four bearings 142, 144, 146, 148 (not shown) to slide rails 148, 150 securely mounted to the support rails 102, 140. This accommodates the change in distance between the first supports 76 of the motion control apparatuses on the respective front 60 and rear 68 rails, particularly when the carriage platform 14 and body tub 12 are yawed or pitched up and down, but also to some extent if and when rolled about an axis non-parallel to the adjacent occupant support rail 102, 140.

The motion control apparatuses 52, 54, 56, 58, it will be seen, provide six degrees of motion for the carrier platform 14 and body tub 12, i.e. rotation about three axes (pitch, roll and yaw) as well as heave (up/down) translation, surge (forward/backward) translation and sway (left/right) translation. With the configuration shown it is easily possible for the simulator 10 to provide + or −20 degrees of rotation in yaw, + or −10.25 degrees of rotation in pitch, + or −7.7 degrees of rotation in roll, +1000 and −220 mm of translation in surge, + or −350 mm of translation in sway, and +89 to −93 mm of translation in heave relative to the neutral point shown. The yaw, pitch, roll and surge all have substantially more movement than in a prior rocker arm/type simulator. The sway may also be made substantially larger, if desired, simply by lengthening the front 60 and rear 68 rails. The performance of the simulator 10 in heave is approximately six times greater in travel than in a prior rocker arm-type simulator similar to that disclosed in GB-A-2378687.

The simulator 10 can therefore provide a more realistic simulation of real conditions including the substantial vertical forces which are sustained in reality by some vehicles, such as when a real racing car is encountering very substantial vertical acceleration while bottoming at up to 300 km/h through the famous "Eau Rouge" dip/corner at the Spa-Francorchamps race track where the Formula 1 (registered trade mark) Belgian Grand Prix is typically held.

The substantially improved performance may also be useful in simulating other types of vehicles such as off-road or tracked vehicles which may encounter bumpy conditions at high speed.

Figure 5:
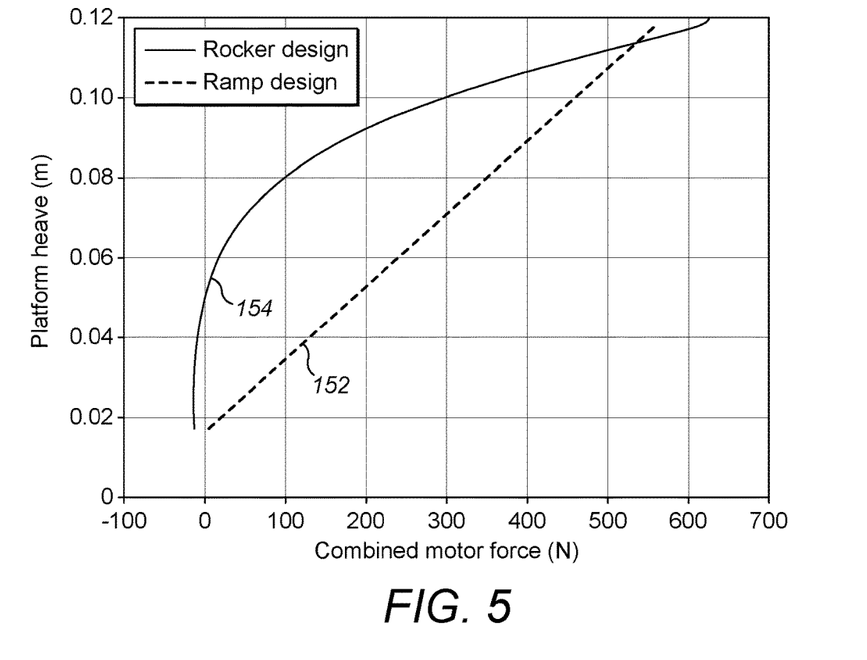
FIG. 5 shows comparative combined motor force/platform heave curves for the present specific embodiment marked "ramp design" and for a different control system having a rocker arm marked "rocker design"

As shown in FIG. 5, in the present simulator 10, the response graph for combined motor force against platform heave is substantially linear. In contrast, the equivalent response graph 154 for a rocker arm-type design is curved with a substantially varying gradient, being almost vertical at near zero combined motor force, generally becoming less steep with increasing combined motor force. Therefore, the control of the simulator 10 is not only highly responsive but also reliable and easy to control, enabling a high frequency bandwidth for response to control commands.

Figure 3A:
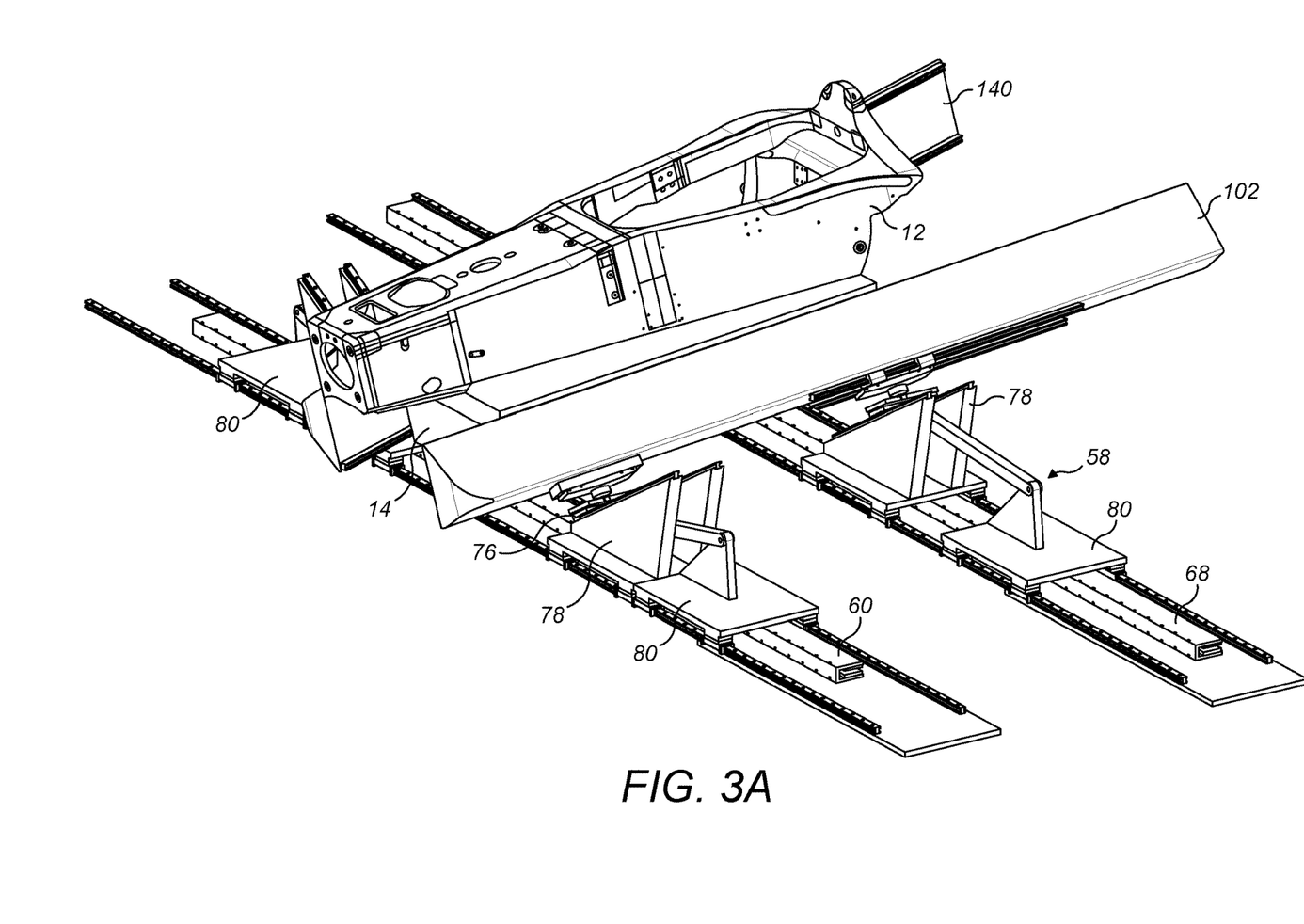
FIG. 3a shows the simulator in a pitched forwards configuration.

FIG. 3a shows an example of a configuration in which the third supports 80 of the first and second motion control apparatuses 52, 54 have been moved close to the second supports 78 thereof, thereby lowering the first supports 76 to near the bottom of the inclined paths 88, thereby inducing a forward pitch on the carrier platform 14 and body tub 12. In contrast, the third supports 80 of the third and fourth motion control apparatuses 56, 58 have been moved away from the second supports 78 to raise up the rear of the rails 102, 140.

Figure 3B:
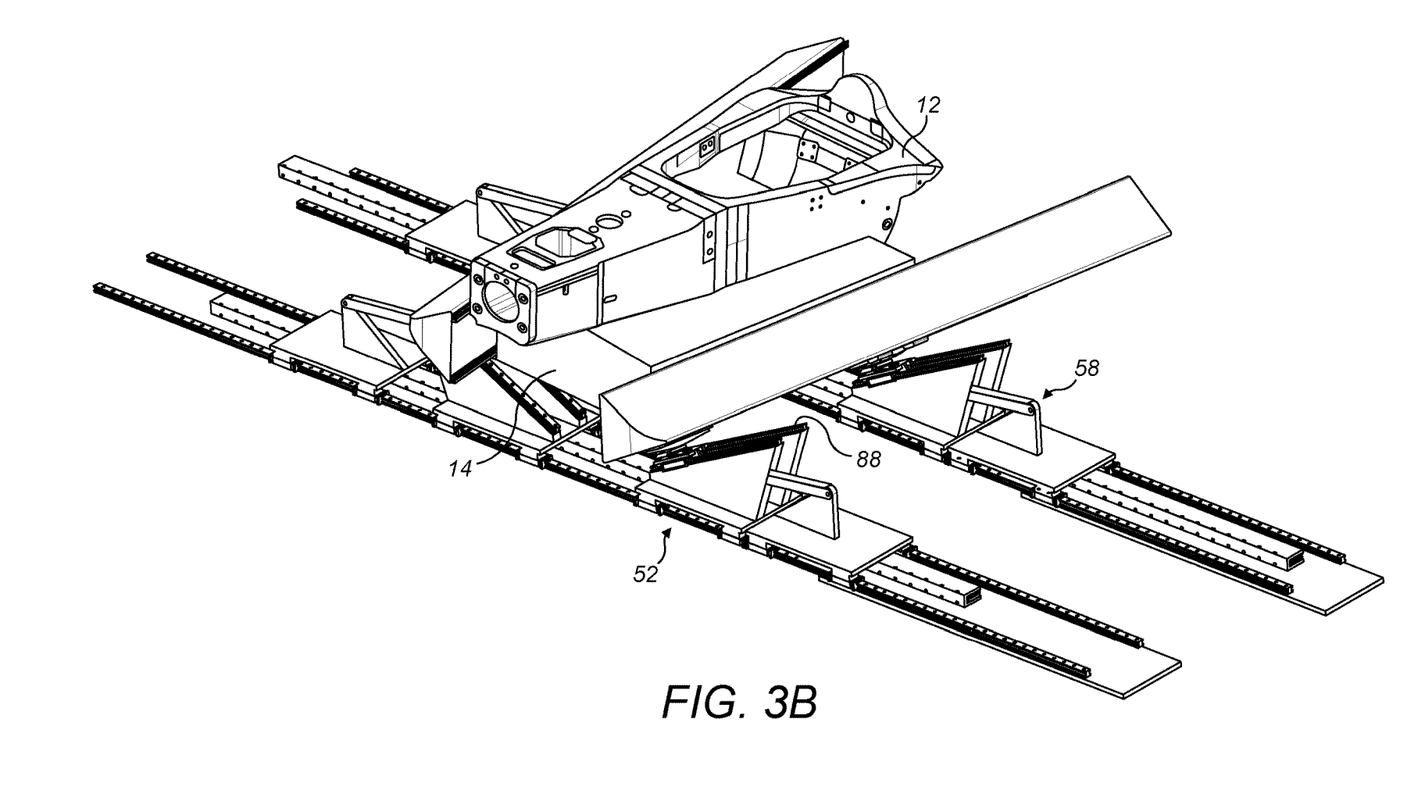
FIG. 3b shows the simulator in a rolled to the left configuration.

FIG. 3b shows a configuration in which the body tub 12 and carrier platform 14 have been yawed to the left by positioning the first supports 76 of the left hand ones of the motion control apparatuses 52, 58 low down on the inclined paths 88 but the right hand ones high up, thereby configuring the body tub 12 with a roll to the left.

Figure 3C:
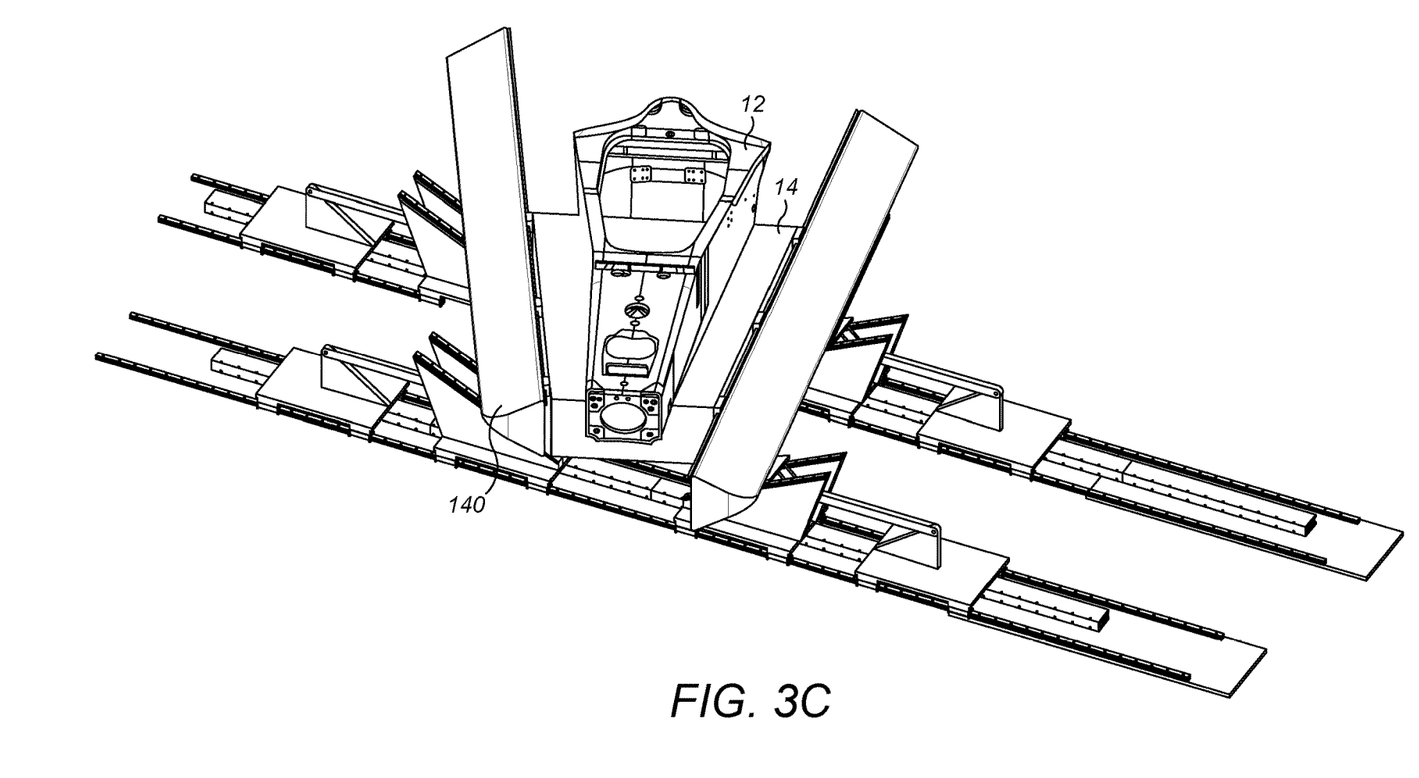
FIG. 3c shows the simulator in a yawed to the left configuration.

FIG. 3c shows a configuration in which the motion control apparatuses 52, 54, 56, 58 have been configured so as to yaw the body tub 12 and carrier platform 14 to the left, with the carrier platform sliding along to the front of the right hand support rail 140.

Figure 3D:
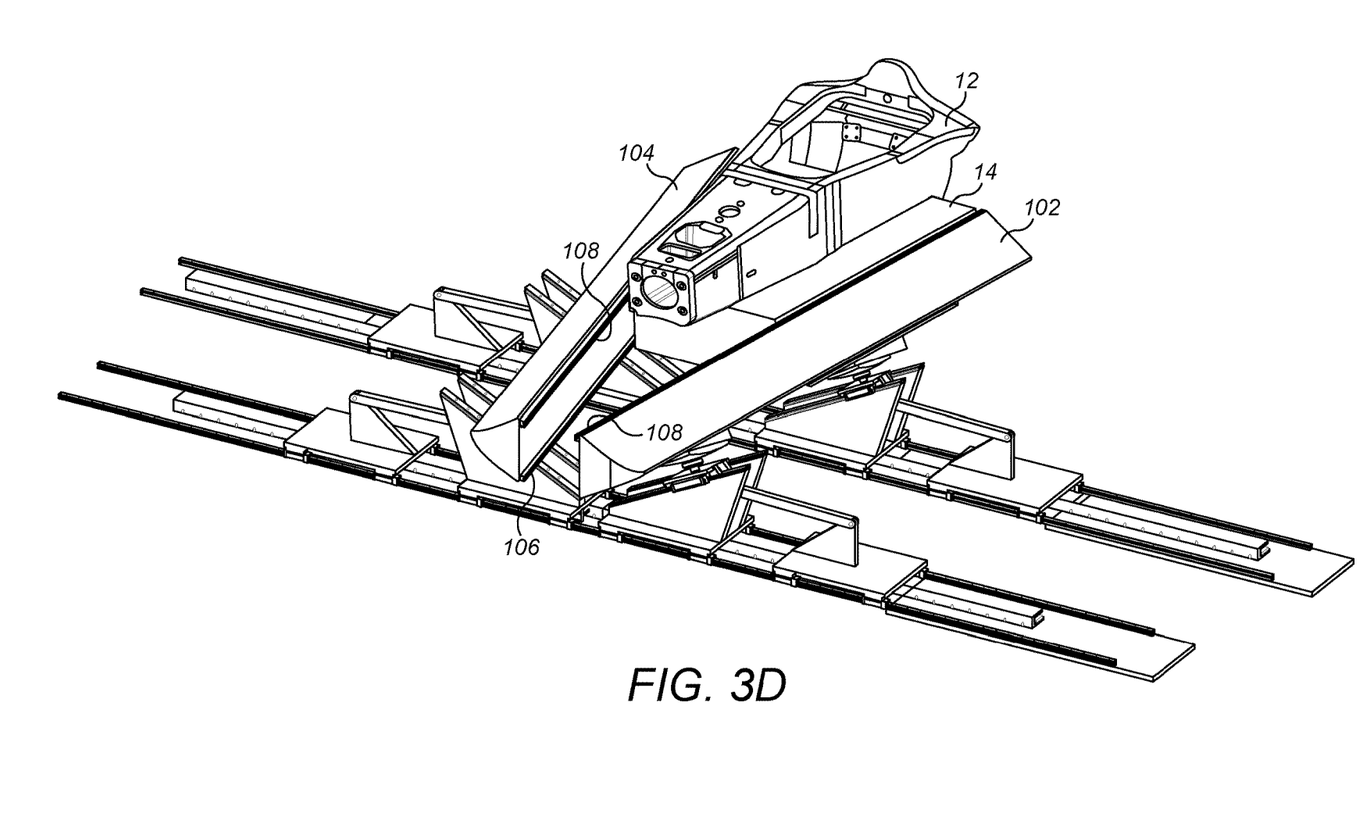
FIG. 3d shows the simulator in a surged rearwards configuration.

FIG. 3d shows a configuration in which the four motion control apparatuses 52, 54, 56, 58 have been configured so as to push the left 102 and right 140 support rails together thereby causing a rearward surge in which the carrier platform 14 and body tub 12 have slid along the rails 106, 108 of the two support rails 102, 104.

The simulator 10 achieves good displacement, velocity and frequency bandwidth while enabling a high level of heave and surge in a system which is extremely stiff and can provide a 2-1 motion ratio which may be advantageous with small and lightweight motors/actuators able to provide the force range shown in FIG. 5. The simulator 10 also provides six degrees of movement as described above. If desired, each motor may be provided with bump stops or end stops for travel. In the case of a power loss or switching off of power to the motors of the simulator 10, the carrier platform 14 may descend to a lowered position or brakes (not shown) may be applied to fix the position of the carrier platform 14.

The use of a sloped inclination at the inclined path 88 to transform a horizontal motion into a vertical motion increases the motion envelope and performance of the motion of the simulator 10 compared to prior systems. The motion ratio is very much more linear than in prior systems and it is significantly easier to design the control algorithms for motion, especially pitch, heave and roll, and it is considerably easier to produce a stiff system capable of operating with high bandwidth. The prior rocker arm system would have to be substantially scaled up to provide additional heave travel and this would increase the moving mass of the system and reduce the stiffness which would have a detrimental effect on the response bandwidth of the motion system. The use of a wedge or inclined path as in the present embodiment allows for more vertical travel, more linear motion ratio, enables less moving mass and provides a stiffer design which increases the travel and bandwidth of the system. The wedge or inclined path also allows for a more linear combined motor force compared to the prior art as the angle of the almost horizontal connector rod 132 is considerably smaller than would be required for a similar heave travel with a rocker arm-design. This therefore provides a frequency response which is consistent over the whole movement range and allows for greater control. The angle of the inclined path 88 can be chosen to provide a 2:1 horizontal to vertical motion ratio which is advantageous when small and light motors as used in the present embodiment are used which are not capable of operating at for example, a 1:1 ratio with the loads involved. The motors 36, 38, 40, 42, 44, 46, 48, 50 are mounted on the sleds or baseplates of the second 78 and third 80 supports and so can easily travel all of the way along the rails 60, 68 and the length of the rails can easily be chosen to suit the application.

The use of the wedge or ramp also provides a high level of stiffness since the load of the user, body tub, carrier platform 14 and rails 102, 140 is directly supported by the second supports 78 via the first support 76 without the requirement of a member suffering significant torsion or bending stress. The motion simulator 10 is highly scalable and may be applied for various types of vehicles, including spacecraft, aircraft, hovercraft, watercraft, land vehicles including motor land vehicles and racing cars, as well as off-road vehicles and tracked vehicles.

The invention is not restricted to simulation of traditional vehicles and, for example, the tub 12 may be replaced with equipment used in sports, such as for training or entertainment. For example, by fitting luge, sled, skeleton, bobsleigh, ski boot binding, snowboard binding or other sports equipment to the carrier platform 14 in place of the tub 12, training such as for elite sports athletes may be accomplished in preparation for real racing competition. For example, the apparatus may be used for an elite skeleton rider to practice a particular skeleton course before visiting the real skeleton racing course.

Furthermore, the rails 102, 140 compose large triangular box sections which in practice in the embodiment shown may be approximately 30 cm high, therefor providing a very substantial amount of stiffness. Furthermore, the rails 102, 140 do not move forward relative to the rails 60, 68. Therefore, the motion simulator 10 can be used in a relatively confined space where the display means 32 may be positioned closely in front of the rail 60.

Various modifications may be made to the embodiment described without departing from the scope of the invention as defined by the accompanying claims.

The invention claimed is:

1. A motion simulator comprising an occupant housing support structure, a first motion control apparatus, a second motion control apparatus, and a base support, the first and second motion control apparatuses each supporting the occupant housing support structure from the base support, each of the first and second motion control apparatuses comprising a height controller comprising a first support and a second support, the height controller configured to control height of the first support relative to the second support, the first support being translationally coupled to the second support for movement relative thereto along an inclined path of the second support,
 the second support of the first motion control apparatus and the second support of the second motion control apparatus being arranged to translate independently along the base support,
 each motor control apparatus including a respective motor for driving the first support relative to the second support.

2. The motion simulator of claim 1, wherein each of the second supports includes a wedge configured to control relative motion between the first and second supports with a wedging action.

3. The motion simulator of claim 1, wherein the inclined path is within or substantially within an inclined plane.

4. The motion simulator of claim 3 configured, in use, for the inclined plane to be configured at an angle of 20 to 40 degrees to horizontal.

5. The motion simulator of claim 4, wherein the angle is 25 to 30 degrees.

6. The motion simulator of claim 1, further comprising a guide element configured to guide travelling of one or both of the first supports along the inclined path of a respective second support.

7. The motion simulator of claim 1, wherein one or both of the first supports includes a pivotal connection arranged for connection to an occupant support member.

8. The motion simulator of claim 7, wherein the base support comprises a linear motor drive rail.

9. The motion simulator of claim 7, wherein the base support comprises a first base rail, the first motion control apparatus being located to one side of the occupant housing support structure, the second motion control apparatus being located on or upon an extension of the first base rail on an opposite side of the occupant housing support structure.

10. The motion simulator of claim 9, wherein the occupant housing support structure includes an occupant carrier base member, in which a first occupant support rail is coupled to the first support of the first motion control apparatus and to the occupant carrier base member, and in which a second occupant support rail is coupled to the first support of the second motion control apparatus and to the occupant carrier base member.

11. The motion simulator of claim 10, wherein the occupant support rails of the first and second motion control apparatuses are configured non-parallel to one another such that relative motion of the first supports of the first and second motion control apparatuses towards or away from one another causes sliding of the occupant carrier base member in a substantantially perpendicular direction which is generally a longitudinal direction of the motion simulator.

12. The motion simulator of claim 10, including an occupant station mounted on the occupant carrier base member.

13. The motion simulator of claim 12, wherein the occupant station includes solo seating for a single user, or tandem, side by side, row or multiple seating for multiple users.

14. The motion simulator of claim 9, including a second base support in the form of a second base rail, wherein the second base rail is spaced from the first base rail, and further comprising third and fourth motion control apparatuses on respective one and other sides of the occupant housing support structure at the second base rail and longitudinally spaced from the first and second motion control apparatuses.

15. The motion simulator of claim 14, wherein the first supports of either the first and second or the third and fourth motion control apparatuses are slidably coupled to the first and second occupant support rails.

16. The motion simulator of claim 1, further comprising a guide element configured to guide travelling of the second support along the base support.

17. The motion simulator of claim 1, further comprising a motor for driving each of the second supports along the base support.

18. The motion simulator of claim 1, wherein the motor for driving the first support relative to the second support is adapted to drive a first and second third support along the base support, the third supports each being connected by a rod to a respective first support.

19. The motion simulator of claim 18, wherein each of the rods is pivotally connected to each of the respective first and third supports, such that a respective rod is configured to transfer load between the respective first and third supports so as to move the first support relative to the second support substantially without rotation of the first support relative to the second support.

20. The motion simulator of claim 1, wherein the motion simulator is scaled to be applied as an aircraft, spacecraft, hovercraft or water craft simulator.

21. The motion simulator of claim 1, wherein said motion simulator is scaled to be applied as a motor land vehicle simulator.

22. The motion simulator of claim 21, wherein the motion simulator is scaled to be applied as a motor car simulator.

23. The motion simulator of claim 22, wherein the motor car simulator is a single seat motor car simulator and the occupant housing comprises a single seat body tub.

24. The motion simulator of claim 21, wherein the motor land vehicle simulator is scaled to be applied as a tracked or offroad vehicle simulator.

* * * * *